W. O. JÜRGENS.
PERAMBULATOR.
APPLICATION FILED MAY 16, 1914.

1,102,153.

Patented June 30, 1914.

WITNESSES.
W. A. Sinden
C. A. Walter

INVENTOR.
WILHELM OSCAR JÜRGENS.
by R. Hudd___
Attorney.

UNITED STATES PATENT OFFICE.

WILHELM OSCAR JÜRGENS, OF LEUTZSCH-LEIPZIG, GERMANY.

PERAMBULATOR.

1,102,153.

Specification of Letters Patent. Patented June 30, 1914.

Application filed May 16, 1914. Serial No. 839,072.

*To all whom it may concern:*

Be it known that I, WILHELM OSCAR JÜRGENS, a citizen of the German Empire, residing at Leutzsch-Leipzig, in Germany, have invented certain new and useful Improvements in Perambulators, of which the following is a specification.

The object of this invention is to provide a perambulator with means whereby the weight of the carriage body can conveniently be taken off the road wheels, for the purpose of relieving the tires. To this end I provide the carriage body with an underframe having casters arranged at the front and rear of the road wheels, and I make the latter vertically movable so that they can alternately be held clear of the ground, leaving the carriage supported by the casters, or can be lowered and made to support the carriage with the casters clear of the ground.

An embodiment of the invention is shown in the accompanying drawing, in which—

Figure 1:
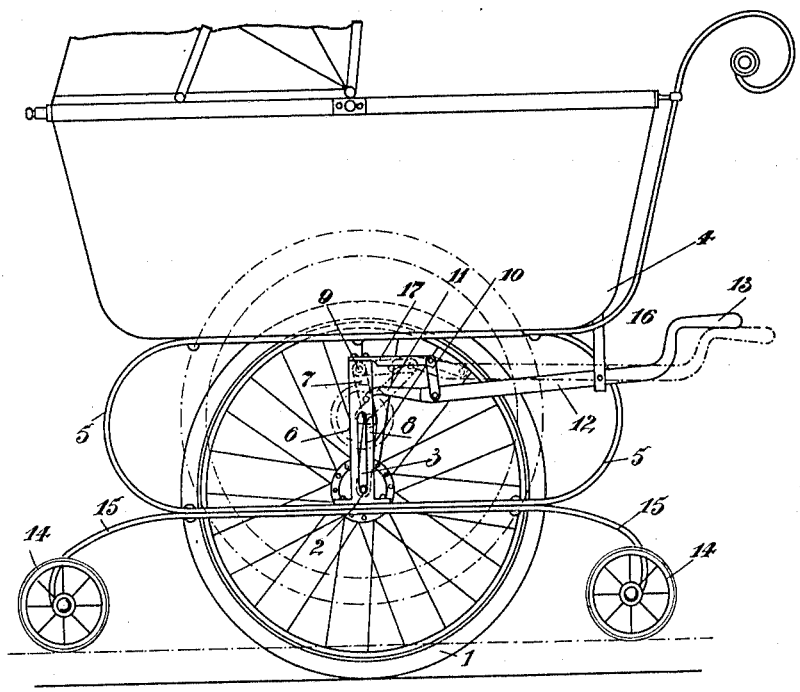
Figure 2:
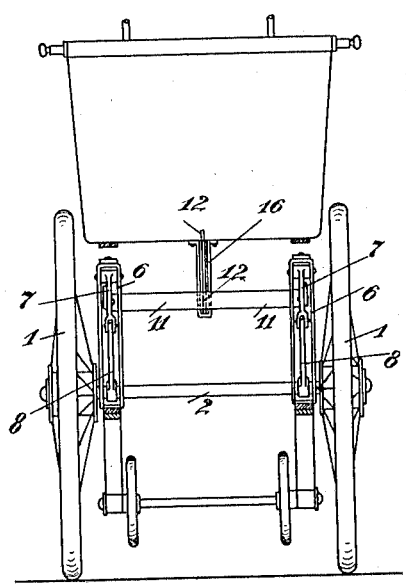

Figure 1 is a side view of the perambulator, and Fig. 2 a front view thereof.

In the drawing, 1 designates the road wheels, of which there is one pair, mounted upon an axle 2 vertically movable in slots 3, the latter being formed in vertical guides 6 mounted upon frame springs 5 supporting the carriage body 4. There are two parallel guides 6 at each side, as shown in Fig. 2. Mounted within each pair of guides 6 is a toggle joint 7, 8 whose member 7 has a fixed pivot 9 at the top of the guides 6, the member 8 being hinged upon the axle 2, so that by flexing and extending the toggle joints the axle with the wheels 1 can be raised and lowered respectively. In Fig. 1 broken lines show the wheels in the raised position.

To the upper end of each pair of guides 6 is fixed an arm 17, to which is pivoted a link 10, and the two links 10 are connected to a lever having a forked arm 11, pivoted to the toggle members 7, and a longer arm 12, provided with a handle 13. The arm 12 works in a guide 16, in which it can be fixed, by means of a pin, in either of two end positions. In one of these positions the toggle joints are flexed, and in the other they are extended.

To the frame springs 5 are fixed springs 15, which carry the axles of small wheels or casters 14 at the front and rear of the wheels 1. When the toggle joints are flexed the axle 2 is about half-way up the slots 3 in the guides 6, and the carriage rests on the casters 14, the wheels 1 being held clear of the ground. By extending the toggle joints the wheels 1 are lowered, and the carriage and casters are raised, as shown in Fig. 1.

What I claim as my invention and desire to secure by Letters Patent of the United States is:—

1. In a perambulator the combination of frame springs, axle guides mounted on said frame springs, an axle vertically movable in said guides, a pair of road wheels mounted upon said axle, casters mounted at the front and rear of said road wheels and means including toggle mechanism for vertically adjusting said road wheels in said guides, for the purpose set forth.

2. In a perambulator, a body, springs supporting the body, an under-frame mounted on the springs, casters mounted upon the forward end and rear ends of the under-frame, vertical guides rising from the under-frame, an axle mounted for vertical movement in the guides, supporting wheels upon the ends of the axle, and means for raising and lowering said axle in the guides whereby to alternately support the under-frame upon the casters and the wheels.

3. In a perambulator, an under-frame, springs rising from the under-frame, a body mounted on said springs, casters at the opposite ends of the under-frame for supporting the same, vertical guides rising from the under-frame, a transverse shaft mounted in the guides, supporting wheels carried upon the opposite ends of the shaft, toggle levers fixed to the tops of the guides and having their lower ends hinged to said shaft, an operating arm carried upon the guides and having one end secured to the toggle levers, a handle on the said arm adapted to move the same whereby to open and close said toggle levers, and locking means upon the body to hold said operating arm in adjusted position.

In witness whereof I have signed this specification in the presence of two witnesses.

WILHELM OSCAR JÜRGENS.

Witnesses:
RUDOLPH FRICKE,
W. S. ROBSON.